Nov. 3, 1959  R. Z. SORENSON  2,910,929
TOASTER APPARATUS
Filed Jan. 3, 1957  3 Sheets-Sheet 1
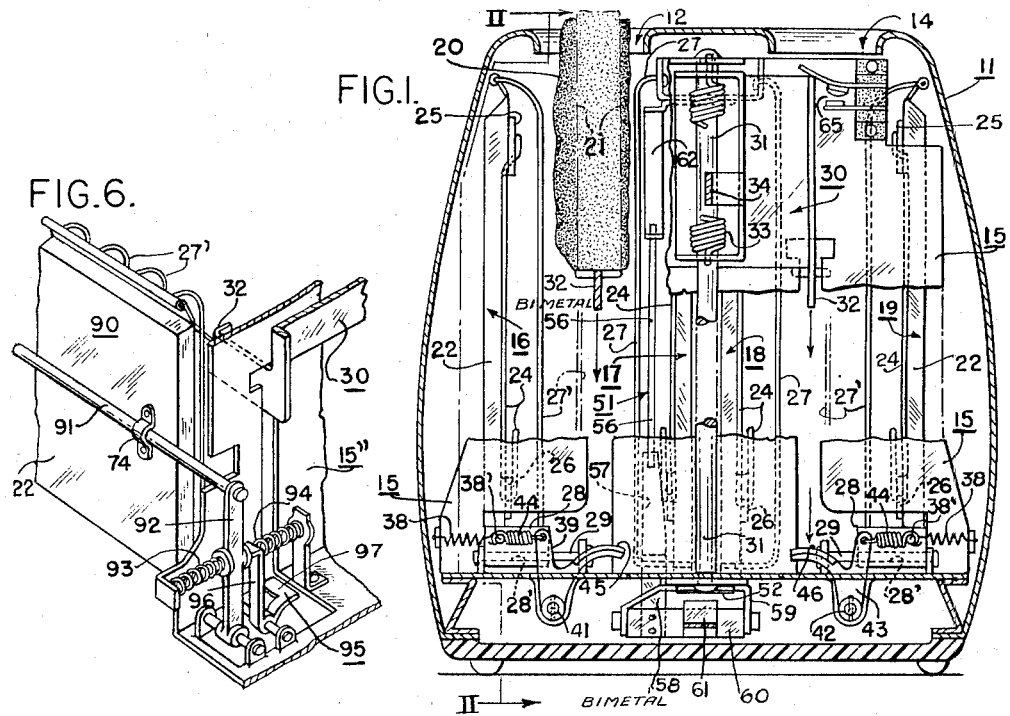
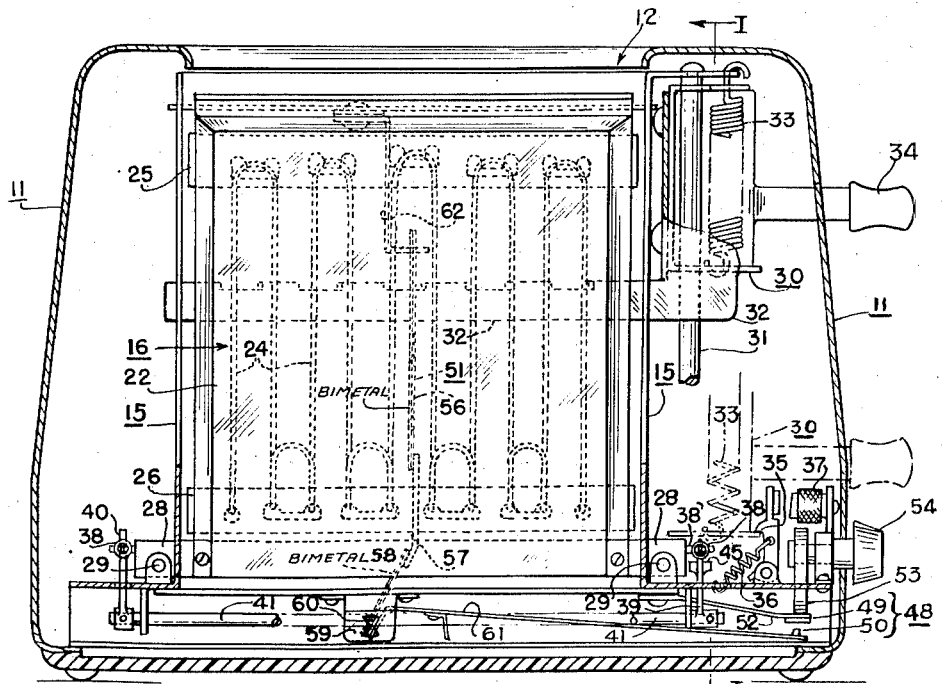
INVENTOR
RALPH Z. SORENSON
BY M. C. Freudenberg
ATTORNEY Nov. 3, 1959 R. Z. SORENSON 2,910,929
TOASTER APPARATUS
Filed Jan. 3, 1957 3 Sheets-Sheet 2
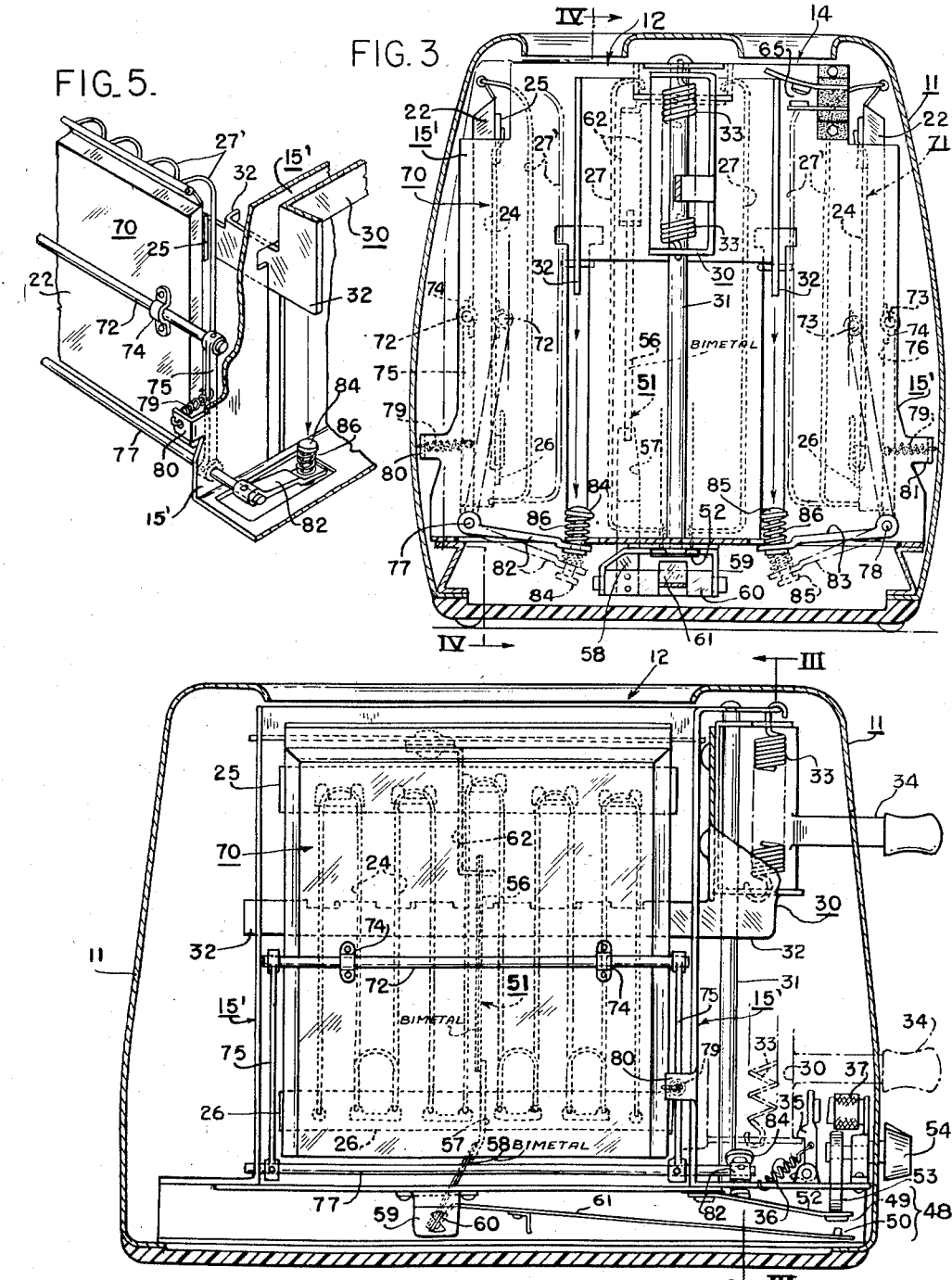
INVENTOR
RALPH Z. SORENSON
BY M. C. Freudenberg
ATTORNEY Nov. 3, 1959 R. Z. SORENSON 2,910,929
TOASTER APPARATUS
Filed Jan. 3, 1957 3 Sheets-Sheet 3

INVENTOR
RALPH Z. SORENSON
BY M. C. Freudenberg
ATTORNEY

United States Patent Office 2,910,929
Patented Nov. 3, 1959

2,910,929

TOASTER APPARATUS

Ralph Z. Sorenson, Mansfield, Ohio, assignor to Westinghouse Electric Corporation, East Pittsburgh, Pa., a corporation of Pennsylvania Application January 3, 1957, Serial No. 632,357

2 Claims. (Cl. 99—390)

This invention relates to an improved toasting heater construction for an electric toaster and particularly to an arrangement of relatively movable heaters for toasting bread slices, muffins or the like of different thicknesses.

Among the objects of this invention is to provide an improved electric toaster for uniformly toasting the opposite sides of bread slices, muffins or the like of different thicknesses.

A further object of this invention is to provide an improved toasting device that will successively toast thick and thin slices of bread to the same degree of brownness without requiring manual adjustment of the toaster color control selector.

It is another object of this invention to improve the construction of an electric toaster having a plurality of toasting chambers therein to permit bread slices of different thicknesses to be toasted uniformly during a single toasting operation.

Still another object of this invention is to improve the construction of a toaster having a bread condition responsive thermostat to control the duration of a toasting operation in order to uniformly toast, during successive toasting operations, both sides of bread slices having different thicknesses.

This invention may be applied to an electric toaster of the pop-up type having one or more toasting chambers with electric heaters disposed on opposite sides of each chamber to toast a slice of bread therein. A bread supporting structure extends into each toasting chamber and is movable therein between bread receiving and bread toasting positions. At least one of the heaters of each toasting chamber is movable toward and away from the position to be occupied by a slice of bread during a toasting operation. Each movable heater is spaced far enough from the heater on the opposite side of its associated toasting chamber, when the bread support is in its non-toasting position, that a bread slice of any thickness capable of being toasted in the toaster will readily move between the heaters when the support is moved to its toasting position. Near the end of movement of the bread support from non-toasting position to toasting position, each movable heater is automatically moved toward the bread slice. Each heater includes guard wire means engageable with the surface of the bread to keep the heating element out of direct contact with the bread and to uniformly space the heating element from the bread surface. The movable heaters are provided with means for preventing further movement after engagement with the bread slice so that the bread will not be too tightly clamped between the heaters.

The movable heating elements may be pivotally or universally mounted so that they can be moved not only toward and away from the bread, but also may be inclined with respect to the heater on the opposite side of the chamber to take care of tapered or otherwise irregular bread slices.

A bread temperature sensing thermostat is supported in one of the toasting chambers so as to be uniformly spaced from each bread slice toasted therein, regardless of thickness. This thermostat automatically terminates the toasting operation, at which time the movable heaters are retracted from the bread being toasted and the bread support moves to its non-toasting position.

The foregoing and other objects are effected by the invention, as will be apparent from the following description and claims taken in connection with the accompanying drawings, forming a part of this application, in which:

Fig. 1 is a vertical section taken through a bread toasting structure along the line I—I of Fig. 2;

Fig. 2 is a vertical section taken along the irregular line II—II of Fig. 1;

Fig. 3 is a view similar to Fig. 1 illustrating a second embodiment of this invention;

Fig. 4 is a vertical section taken on line IV—IV of Fig. 3;

Fig. 5 is a perspective view of a portion of the structure shown in Fig. 3 showing the actuating mechanism for a movable toaster heater;

Fig. 6 is a view similar to Fig. 5, but showing a third embodiment of this invention;

Figure 7:
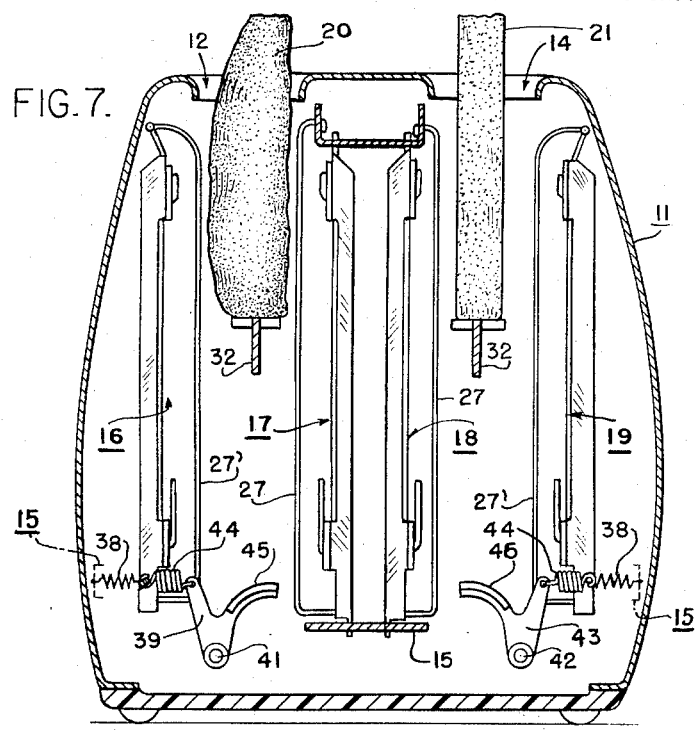
Fig. 7 is a view similar to Fig. 1 with the movable parts of the toaster in non-toasting position but with several of the details of Fig. 1 omitted.
Figure 8:
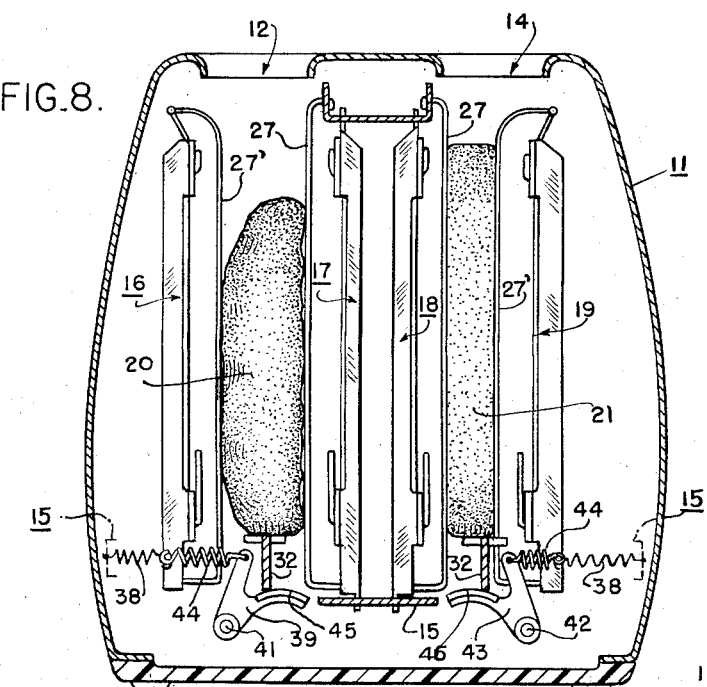
Fig. 8 is a view similar to Fig. 7, but with the bread supports and movable heaters in position for toasting bread slices of different thickness.

Although details of one embodiment of this invention are shown in Figs. 1 and 2, a simplified illustration of this embodiment with many of the details omitted appears in Figs. 7 and 8 to more clearly illustrate the movements of the bread supports and the movable heaters.

Referring to Figs. 1 and 2 of the drawings, there appears a toaster structure comprising a metal housing 11 enclosing two toasting chambers 12 and 14 accessible through elongated openings in the top of the housing 11. Supported within the housing is a frame 15 which carries toaster heaters 16, 17, 18 and 19. The heaters 17 and 18 are stationary in back-to-back relation near the center of the toaster and the heaters 16 and 19 are supported at the outer sides of the chambers 12 and 14 for movement toward and away from the heaters 17 and 18, respectively. The heaters for each toasting chamber are relatively movable so that the distance therebetween may be varied to accommodate and uniformly toast bread slices of different thickness such as the relatively thick muffin 20 and thinner bread slice 21 shown in Figs. 1, 7 and 8.

The heaters 17, 18 and 19 are generally similar to the heater 16 which includes a reflecting support 22 in the form of an aluminum plate. An electrical resistance element 24 is formed in a generally serpentine configuration and supported in insulated relationship on the reflecting support 22 by mica strips 25 and 26. The heaters 17 and 18 are provided with vertically extending guard wires 27 between the resistance elements 24 and the area to be occupied by the bread, to prevent direct contact of the resistance elements with the bread being toasted. Similar guard wires 27' adjacent the movable heaters 16 and 19 are attached thereto for movement therewith. The heaters shown herein are generally similar to the toaster heaters described and claimed in Palmer et al. Patent No. 2,778,912, granted January 22, 1957 to the assignee of the present invention.

The movable heaters 16 and 19 are identical and are independently supported for movement relative the heaters 17 and 18, respectively, by means comprising blocks or shoes 28 which slide on stationary track members 29. The blocks 28 are attached to the opposite ends of the heaters near the bottom thereof and contain parallel passages 28' through which pass the stationary horizontal rods or track members 29, permitting heaters 16 and 19 to move toward and away from the heaters 17 and 18, respectively. The rods 29 are supported by tabs formed out of the frame 15.

A carriage 30 is supported for vertical movement on a vertical rod 31 at one end of the frame 15. A pair of bread supports 32 extend from the carriage 30 into the toasting chambers 12 and 14. The carriage 30 and bread supports 32 are arranged for movement between an upper bread receiving position and a lower bread toasting position. The carriage is biased upwardly by a spring 33 and is provided with a handle 34 extending to the outside of the toaster housing 11 through a vertical slot in one end thereof to permit the carriage to be manually actuated from its bread receiving position to its bread toasting position.

Upon being moved to the bread toasting position the carriage 30 will be detained therein by a latch 35 as seen in Fig. 2. The latch 35 is biased to its latching position by a spring 36 and is movable to unlatch the carriage by means of an electromagnet 37 disposed to exert a pull on a magnetic portion of the latch when the electromagnet is energized at the end of a toasting operation in a manner explained hereinafter. A stop limits the spring biased movement of the latch 35 when the carriage 30 is in its non-toasting position.

The movable heaters 16 and 19 are biased outwardly away from the heaters 17 and 18, respectively, by means of tension springs 38. Each of these springs 38 has one end fastened to a projection 38' on one of the blocks 28 and its other end is secured to a portion of the frame 15.

The heater 16 is movable, against the bias of the springs 38, toward heater 17 by means of levers 39 and 40 attached to opposite ends of a rotatable horizontal rod 41 supported from the frame 15 beneath the toasting chamber 12 and extending generally parallel thereto. A similar rod 42 beneath the chamber 14 actuates the heater 19 relative heater 18 through similar levers, but only the lever 43 at one end of the rod is shown in the drawings. The above-mentioned levers on the rods 41 and 42 are connected to the projections 38' on the blocks 28 by tension springs 44 which are somewhat stronger than the above mentioned springs 38 for a purpose referred to hereinafter. The levers 39 and 40 are actuated to pull the heaters inwardly by mechanical means comprising other lever arms 45 and 46 which are engaged by the lower edges of the bread support when the carriage approaches its toasting position. These lever arms 45 and 46 will be depressed by the bread support and are rigidly connected to the rods 41 and 42 to move the latter clockwise and counterclockwise, respectively, in response to the lowering movement of the carriage 30.

The springs 44, being stronger than the springs 38, cause the heaters 16 and 19 to move with levers 39, 40 and 43. The guard wires 27' on the movable heaters will engage the bread slices in the toasting chambers and push them into engagement with the guard wires 27 adjacent the heaters 17 and 18. The bread will then exert sufficient force against the wires 27' on the movable heaters to interfere with further movement of the movable heaters 16 and 19. Lost motion is then permitted between the levers on the rods 41 and 42 and the heaters 16 and 19 by stretching the stronger springs 44. The positions in which the movable heaters will stop is dependent on the thickness of the bread slices being toasted. Since the movable heaters are actuated by separate spring means they may be stopped different distance from the heaters 17 and 18 respectively by bread slices of different thickness being toasted at the same time as shown in Fig. 8.

The electromagnet 37 is energized to release the latch 35 by the closure of a switch 48 comprising an adjustable contact 49 and a contact 50 movable by a thermally responsive structure 51. The adjustable contact 49 is carried by a spring arm 52 that is supported by and electrically insulated from the frame 15. The arm 52 is biased into engagement with a cam 53 connected to an adjustable color control knob 54 extending through the end wall of the housing 11.

The thermally responsive structure 51 comprises a main bimetallic strip 56 located within the toasting chamber 12, between the heating element 24 and the guard wires 27 of the heater 17. The lower end of the main bimetal 56 is attached to a rigid metal bar 57 and the lower end of the latter is attached to an ambient temperature compensating bimetallic strip 58. The compensating bimetal 58 is disposed beneath the toasting chamber 12 and out of good heat transfer relationship with the resistance elements 24 of the heaters 16 and 17. The lower end of the strip 58 is pivotally supported on a bracket 59 depending from the frame 15 by a horizontal bar 60 rigidly attached to the strip and to an elongated arm 61 which carries the movable switch contact 50. The upper end of the main bimetal 56 is restrained against lateral movement by being slidably retained in a hole in a rigid support member 62 depending from the frame 15 near the top of the heater 17.

During a toasting operation, the main bimetal 56 will respond to a changing temperature condition at the surface of the bread slice and will bow or deflect in a plane parallel to the surface of the bread thus remaining uniformly spaced from each bread slice toasted in chamber 12. The high expansion side of the main bimetal 56 faces the left end of the toaster as seen in Figure 2 and, upon being heated, this bimetal bows to cause the arm 61 to swing counterclockwise about the bar 60 and close the contacts of switch 48. The switch 48 thus energizes the electromagnet 37 to release the carriage 40 for movement to its non-toasting position. This thermally responsive toaster control is similar to that disclosed in Palmer Patent No. 2,865,279, granted December 23, 1958, to the assignee of this invention.

The operation of a toaster incorporating any of the embodiments described herein will be the same as far as the user is concerned. The user will select the color of toast desired by adjusting the control knob 54. Before a toasting operation, the heaters at each chamber assume positions with maximum spacing therebetween, as indicated in Fig. 7. The user inserts bread slices to be toasted into the toasting chambers 12 and 14 and depresses the handle 34 to lower the carriage 30. The movable heaters 16 and 19 will be moved into engagement with the bread as seen in Fig. 8, and the carriage 30 will be latched in the toasting position. The toasting heaters will automatically be energized by means of a switch 65 to initiate a toasting operation in response to movement of the carriage 30 to toasting position. The switch 65 is held open by the carriage 30 in the non-toasting position of the latter and is biased closed when the carriage is in its toasting position. The movable heaters will automatically assume positions dependent on the thickness of the bread being toasted and thus toast each slice uniformly. When the bread reaches a predetermined toasted condition, as selected by the control knob 54, the thermally responsive structure 51 will close switch 48 to energize the electro-magnet 37 and release the carriage latch 35. The carriage will return to its bread-receiving position, as shown in full lines in Fig. 2, permitting the movable heaters 16 and 19 to return to their wide-slot positions and the switch 65 will automatically open to terminate the toasting operation. If only one slice is being toasted it should be inserted in the chamber 12 in which the thermally responsive structure 51 is located.

Referring to Figs. 3, 4 and 5 there is shown another embodiment of this invention. The toaster shown therein is similar to that of Figs. 1 and 2 with the exception of the supporting and actuating means for the movable outer heaters 70 and 71 and necessary minor modifications of the frame 15'. Reference numerals for the toasting chambers 12 and 14 and for the parts of the toaster that are similar to those shown in Figs. 1 and 2 have been repeated in Figures 3 through 5 and further description of the toaster of these latter figures is omitted except for the description of the outer movable heaters 70 and 71 and their actuators.

The heaters 70 and 71 are constructed like heaters 16 and 19 as far as the reflectors 22, heating elements 24, mica strips 25 and 26 and guide wires 27' are concerned. Extending across the backs of the reflectors 24 of heaters 70 and 71 near the centers thereof are horizontal supporting rods 72 and 73, respectively. The rods are fastened to the reflectors by means of clips 74 which permit the heaters to rotate on the rods. These rods 72 and 73 are carried by vertical lever arms 75 and 76 fastened to a second set of rods 77 and 78 respectively extending along the bottom of the movable heaters 70 and 71. These latter rods 77 and 78 are pivotally supported by the toaster frame 15'.

The movable heaters 70 and 71 are biased to their outer positions by means of tension springs 79 fastened between spring anchoring lugs 80 and 81 on the frame and the lever arms 75 and 76 adjacent one end of each movable heater. These springs 79 move the levers 75 and 76 counterclockwise and clockwise, respectively, about the axis of the rods 77 and 78 as seen in Fig. 3. Attached to the rods are a pair of levers 82 and 83 disposed to be actuated by movement of the bread supports 32 on the carriage 30 as it approaches its toasting position. The bread supports 32 rotate the rods 77 and 78 against the bias of the springs 79 and move the heaters 70 and 71 inwardly toward the opposing heaters 17 and 18. A lost motion arrangement is provided between the bread supports 32 and levers 82 and 83 in order to prevent damage to the toaster and unnecessary squeezing of the bread when further movement of the movable heaters is resisted by the bread slices. The levers 82 and 83 are provided with rivet-like members 84 and 85 having heads that are engaged by the bread supports 32 on the carriage. The members 84 and 85 are biased upwardly relative the levers 82 and 83 by compression springs 86 and are slidable in openings in the levers to provide the lost motion. The springs 86 keep the members 84 and 85 in fixed relationship with respect to levers until the movable heaters can move no further due to engagement of the bread by guide wires 27 and 27', whereupon, the springs 86 will be compressed and the bread supports may move further toward bread toasting position without further movement of the levers 82 and 83.

Referring to Fig. 6, showing a third embodiment of the invention, a movable heater 90 is constructed and supported in a manner somewhat similar to the heater 70 in Figs. 3 through 5. A rod 91, on which the heater 90 is pivotally supported, extends through the end wall of the toaster frame 15'' and is carried at one end by a lever 92 that is pivotally supported on the toaster frame. A similar arrangement, not shown, supports the rod 91 at the other end of the heater.

The lever arrangement which supports the rod 91 is actuated by a pair of compression springs 93 and 94 and a crank 95 pivoted on the frame 15''. The spring 93 is held between a fixed abutment on the frame 15'' and the lever 92 and biases the latter to move the heater 90 toward a heater, not shown, on the opposite side of a toasting chamber for toasting the opposite side of a bread slice as generally shown in the other embodiments of the invention. A vertical arm 96 of the crank 95 engages the lever 92 and the spring 94, supported by a fixed abutment on the frame 15'', biases the crank to overcome the force of spring 93 and move the lever 92 and heater 90 to an outermost position providing maximum spacing between the heaters at the toasting chamber. The crank 96 has another arm 97 that is engageable by the bread support 32. When the support 32 is moved to the bread toasting position, the crank 95 is pivoted clockwise as seen in Fig. 6 to compress the spring 94 and relieve the force that was applied thereby to the heater supporting lever 92. Upon relieving the force of the stronger spring 94 the weaker spring 93 will push the heater 90 to the right until the heater wires 27' of the heater engage a bread slice and further movement of the heater is resisted by the bread. The crank arm 96 will then move out of engagement with the heater supporting lever 92 as the bread support moves to the toasting position.

In each of the above described embodiments of the invention the arrangement of the movable heaters and the actuating linkage therefore operated by the bread support is both simple to operate and adds little to the cost of a toaster, besides providing improved performance in uniformly toasting bread slices of different thicknesses during the same or successive toasting operations without manual adjustment of the toaster control.

While the invention has been shown in several forms, it will be obvious to those skilled in the art that it is not so limited, but is susceptible of various other changes and modifications without departing from the spirit thereof.

What is claimed is:

1. An electrical toasting device comprising a housing, toasting means including a pair of opposed electrical heaters disposed in said housing and having a bread toasting chamber therebetween, said housing having an opening therein to provide access to said chamber, a bread support disposed in said chamber, means for moving said support between a non-toasting position and a toasting position, one of said heaters being movable relative to the other heater to vary the distance therebetween for toasting bread slices of different thicknesses, a resilient element biasing said movable heater in the direction away from the other heater, and means motivated by said bread support for actuating the movable heater toward the other heater in response to the movement of said bread support for non-toasting to toasting position and in opposition to said resilient element, said movable heater including an electrical resistance element and guard means to prevent said element from directly contacting a slice of bread in said chamber.

2. An electrical toasting device comprising a housing, a pair of spaced electrical heaters disposed in said housing and having a bread toasting chamber therebetween, each of said heaters having an electrical resistance element and associated guard means for preventing direct contact of said element with a toast slice in said chamber, one of said heaters being movable relative the other heater to accommodate bread slices of different thicknesses therebetween, spring means for biasing said movable heater toward said other heater, means for opposing said bias to hold said movable heater spaced from said other heater for receiving a bread slice therebetween, a bread support extending between said heaters and movable between a toasting and a non-toasting position, and means responsive to movement of said bread support to toasting position for reducing the force of said opposing means on said spring means to effect movement of the movable heater toward the other heater.

References Cited in the file of this patent

UNITED STATES PATENTS

| | | |
|---|---|---|
| 1,659,610 | Noeth et al. | Feb. 21, 1928 |
| 1,687,712 | Chandler | Oct. 16, 1928 |
| 1,832,831 | Ginder | Nov. 17, 1931 |
| 1,948,739 | Wolcott et al. | Feb. 27, 1934 |
| 1,973,175 | McArdle | Sept. 11, 1934 |
| 2,039,218 | Govoroff | Apr. 28, 1936 |
| 2,347,385 | Wright et al. | Apr. 25, 1944 |
| 2,614,480 | Elmer | Oct. 21, 1952 |
| 2,770,182 | Jensen | Nov. 13, 1956 |
| 2,788,734 | Weeks | Apr. 16, 1957 |
| 2,816,501 | Meyers | Dec. 17, 1957 |